(12) United States Patent
Liu

(10) Patent No.: US 12,317,313 B2
(45) Date of Patent: May 27, 2025

(54) METHOD AND DEVICE FOR CONFIGURING SEARCH SPACE, METHOD AND DEVICE FOR RANDOM ACCESSING, AND STORAGE MEDIUM

(71) Applicant: BEIJING XIAOMI MOBILE SOFTWARE CO., LTD., Beijing (CN)

(72) Inventor: Yang Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 556 days.

(21) Appl. No.: 17/631,431

(22) PCT Filed: Aug. 5, 2019

(86) PCT No.: PCT/CN2019/099314
§ 371 (c)(1),
(2) Date: Jan. 28, 2022

(87) PCT Pub. No.: WO2021/022458
PCT Pub. Date: Feb. 11, 2021

(65) Prior Publication Data
US 2022/0287080 A1 Sep. 8, 2022

(51) Int. Cl.
*H04W 74/00* (2009.01)
*H04W 74/0833* (2024.01)
(52) U.S. Cl.
CPC ..... *H04W 74/006* (2013.01); *H04W 74/0833* (2013.01)
(58) Field of Classification Search
CPC .......... H04W 74/006; H04W 74/0833
See application file for complete search history.

(56) References Cited

U.S. PATENT DOCUMENTS

| 2021/0329703 | A1* | 10/2021 | Yang | H04L 5/001 |
| 2021/0377987 | A1* | 12/2021 | Gong | H04W 72/23 |
| 2022/0225428 | A1* | 7/2022 | Xiong | H04W 72/23 |

FOREIGN PATENT DOCUMENTS

| CN | 108282899 A | 7/2018 |
| WO | WO-2020204653 A1 * | 10/2020 |

OTHER PUBLICATIONS

European Patent Application No. 19940843.6, Search and Opinion dated Jun. 21, 2022, 10 pages.

(Continued)

*Primary Examiner* — Jackie Zuniga Abad
(74) *Attorney, Agent, or Firm* — Cozen O'Connor

(57) ABSTRACT

A method for configuring a search space includes: generating, by an access network equipment, search space configuration information, the search space configuration information including a configuration of a first search space and a configuration of a second search space, the configuration of the first search space being configured to indicate the first search space for carrying a first physical downlink control channel (PDCCH), the first PDCCH being a PDCCH corresponding to message B in a 2-step random access channel (RACH) procedure, the configuration of the second search space being configured to indicate the second search space for carrying a second PDCCH, the second PDCCH being a PDCCH corresponding to message 2 in a 4-step RACH procedure, the first search space and the second search space are different search spaces; and transmitting, by the access network equipment, the search space configuration information.

17 Claims, 8 Drawing Sheets

(56) References Cited

OTHER PUBLICATIONS

Indian Patent Application No. 202247011592, Office Action dated Jul. 8, 2022, 6 pages.
Huawei, et al. "Discussion on MsgB reception" 3GPP TSG-RAN WG2 #106; R2-1907727; May 2019; 3 pages.
PCT/CN2019/099314 International Search Report dated Apr. 29, 2020, 2 pages.
Nokia; et al. "Feature lead summary#3 on 2 step RACH procedures", 3GPP TSG RAN WG1 #97 R1-1907900; May 17, 2019, Reno, USA, 59 pages.

* cited by examiner

METHOD AND DEVICE FOR CONFIGURING SEARCH SPACE, METHOD AND DEVICE FOR RANDOM ACCESSING, AND STORAGE MEDIUM

CROSS-REFERENCE TO RELATED APPLICATION

This application is a national phase of International Application No. PCT/CN2019/099314, filed on Aug. 5, 2019, the entire content of which is incorporated herein by reference.

TECHNICAL FIELD

The disclosure relates to the field of communication technologies, and more particularly, to a method and a device for configuring a search space, a method and a device for random accessing, and a storage medium.

BACKGROUND

A random access is a necessary procedure for establishing a wireless link between a terminal and a network. The terminal and a base station may perform regular data transmission only after the random access procedure is completed.

SUMMARY

According to a first aspect of embodiments of the disclosure, a method for configuring a search space is provided, including: generating, by an access network equipment, search space configuration information, the search space configuration information including a configuration of a first search space and a configuration of a second search space, the configuration of the first search space being configured to indicate the first search space for carrying a first physical downlink control channel (PDCCH), the first PDCCH being a PDCCH corresponding to message B in a 2-step random access channel (RACH) procedure, the configuration of the second search space being configured to indicate the second search space for carrying a second PDCCH, the second PDCCH being a PDCCH corresponding to message 2 in a 4-step RACH procedure, the first search space and the second search space are different search spaces; and transmitting, by the access network equipment, the search space configuration information.

According to a second aspect of embodiments of the disclosure, a method for configuring a search space is provided, including: receiving, by a terminal, search space configuration information, the search space configuration information including a configuration of a first search space and a configuration of a second search space, the configuration of the first search space being configured to indicate the first search space for carrying a first physical downlink control channel (PDCCH), the first PDCCH being a PDCCH corresponding to message B in a 2-step random access channel (RACH) procedure, the configuration of the second search space being configured to indicate the second search space for carrying a second PDCCH, the second PDCCH being a PDCCH corresponding to message 2 in a 4-step RACH procedure, the first search space and the second search space are different search spaces; and storing, by the terminal, the search space configuration information.

According to a third aspect of embodiments of the disclosure, a method for random accessing is provided, including: receiving, by an access network equipment, message A in a 2-step random access channel (RACH) procedure, from a first terminal; determining, by the access network equipment, a search space for carrying a third physical downlink control channel (PDCCH) from a first search space and a second search space, the third PDCCH being a PDCCH corresponding to a response message of the message A; and transmitting, by the access network equipment, the third PDCCH on a resource corresponding to the determined search space; in which, the first search space is configured to carry a first PDCCH, the first PDCCH is a PDCCH corresponding to message B in the 2-step RACH procedure, and the second search space is configured to carry a second PDCCH, the second PDCCH is a PDCCH corresponding to message 2 in a 4-step RACH procedure, and the first search space and the second search space are different search spaces.

According to a fourth aspect of embodiments of the disclosure, a method for random accessing is provided, including: transmitting, by a terminal, message A in a 2-step random access channel (RACH) procedure; determining, by the terminal, a search space for detecting a third physical downlink control channel (PDCCH) based on search space configuration information, the third PDCCH being a PDCCH corresponding to a response message of the message A; and detecting, by the terminal, the third PDCCH based on the determined search space; in which, the search space configuration information includes a configuration of a first search space and a configuration of a second search space, the configuration of the first search space is configured to indicate the first search space for carrying a first PDCCH, the first PDCCH is a PDCCH corresponding to message B in the 2-step RACH procedure, the configuration of the second search space is configured to indicate the second search space for carrying a second PDCCH, the second PDCCH is a PDCCH corresponding to message 2 in a 4-step RACH procedure, the first search space and the second search space are different search spaces.

According to a fifth aspect of embodiments of the disclosure, a device for configuring a search space is provided, including: a processor; a memory for storing executable instructions of the processor; in which, the processor is configured to load and execute the executable instructions to perform the method for configuring the search space according to the first aspect or the method for configuring the search space according to the second aspect.

According to a sixth aspect of embodiments of the disclosure, a device for configuring a search space is provided, including: a processor; a memory for storing executable instructions of the processor; in which, the processor is configured to load and execute the executable instructions to perform the method for random accessing according to the first aspect or the method for random accessing according to the second aspect.

According to a seventh aspect of embodiments of the disclosure, a computer-readable storage medium is provided, in which when instructions in the computer-readable storage medium are executed by a processor, the method for configuring the search space according to the first aspect, the method for configuring the search space according to the second aspect, the method for random accessing according to the third aspect or the method for random accessing according to the fourth aspect are performed.

It is to be understood that both the foregoing general description and the following detailed description are exemplary and explanatory only and are not restrictive of the disclosure.

BRIEF DESCRIPTION OF THE DRAWINGS

The accompanying drawings herein, which are incorporated in and constitute a part of this specification, illustrate embodiments consistent with the disclosure and, together with the description, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

A random access procedure refers to a procedure starting from transmitting by a user a random access preamble to try to access to a network, to before establishing a basic signaling connection with the network, which is configured to enable the terminal to establish data communication with the network side. The random access procedures are grouped into a contention-based random access procedure and a non-competition-based random access procedure. Currently, most terminals adopt the contention-based random access procedure. The contention-based random access procedure includes a 4-step random access channel (RACH) procedure and a 2-step RACH procedure. The following describes the two contention-based random access procedures respectively.

Figure 1:
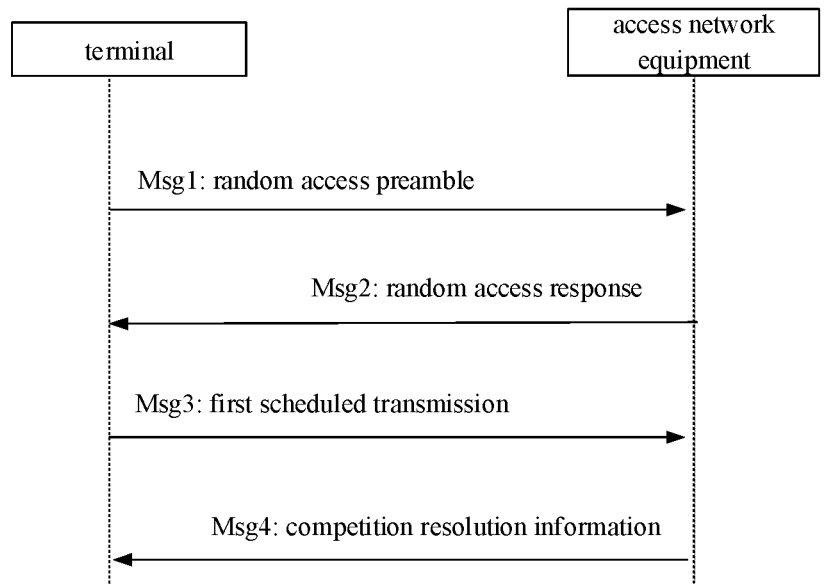
FIG. 1 is a flow chart of a contention-based 4-step RACH procedure.

When the contention-based random access procedure is completed in 4 steps, each step is a message (Msg). In the standard, these 4 steps are called Msg1~Msg4. FIG. 1 is a flow chart of a contention-based 4-step RACH procedure. As illustrated in FIG. 1, the 4-step RACH procedure includes the following.

Step 1, the terminal transmits Msg1 to an access network equipment. Msg1 includes a random access preamble.

The total number of random access preambles available in each cell is 64. Two subsets are defined in these 64 random access preambles. A random access preamble set of each subset is notified to the terminal as a part of the system information. When performing the contention-based random access, the terminal may select any random access preamble from these two subsets and transmit it on a physical random access channel (PRACH) resource (that is, a time-frequency resource).

The random access preambles available for the contention-based random access and the PRACH resource for transmitting the random access preamble are configured by the access network equipment, and a configuration result is notified to the terminal in the cell through a system message.

Step 2, the access network equipment transmits Msg2 to the terminal. Msg2 includes a random access response (RAR).

One Msg2 may include identifiers (that is, index values) of preambles transmitted by different terminals, and respond to random access requests from terminals at the same time. The terminal determines whether it has received the random access response by detecting whether Msg2 carries the identifier of the preamble transmitted itself.

The access network equipment schedules Msg2 by using a physical downlink control channel (PDCCH), and uses the random access radio network temporary identity (RA-RNTI, Random Access-Radio) for addressing (also known as scrambling). The RA-RNTI is determined by a time-frequency resource location of the PRACH carrying Msg1.

Msg2 may include parameters such as the identifier of the random access preamble corresponding to Msg1, an uplink transmission timing advance, an uplink resource allocated for the terminal, and a temporary cell radio network temporary identifier (C-RNTI).

Step 3, the terminal transmits Msg3 to the access network equipment.

After receiving Msg2 correctly, the terminal transmits Msg3 in the uplink resource allocated in Msg2 to complete the first scheduled transmission.

Msg3 may include identity information of the terminal. For example, C-RNTI or temporary C-RNTI.

Step 4, the access network equipment transmits Msg4 to the terminal.

The access network equipment and the terminal complete the final competition resolution through Msg4. The content of Msg4 corresponds to the content of Msg3.

If the terminal is not allocated with the C-RNTI, the access network equipment schedules Msg4 by using the PDCCH scrambled by the temporary C-RNTI. The terminal uses the temporary C-RNTI to address on the PDCCH to obtain a time-frequency resource location of Msg4. After successful addressing, Msg4 is obtained from the time-frequency resource location. Msg4 carries a contention resolution identity (CRI) through a media access control address (MAC) control element (CE). After receiving the MAC CE, the terminal compares it with the identity information transmitted in Msg3. If the two are the same, it is determined that the contention resolution is successful, and the terminal determines that the random access is completed.

If the terminal is allocated with the C-RNTI, the access network equipment schedules Msg4 by using the PDCCH scrambled by the C-RNTI. The terminal uses the C-RNTI to address on the PDCCH. If the addressing is successful, the contention resolution is successful, and the terminal determines that the random access is completed.

Figure 2:
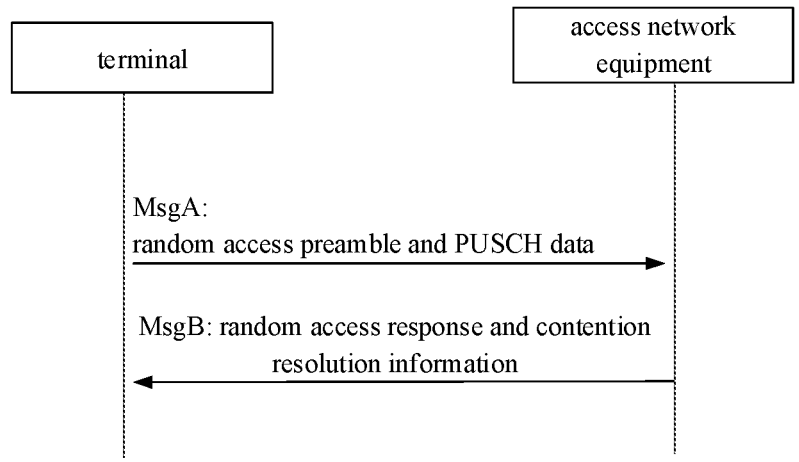
FIG. 2 is a flow chart of a contention-based 2-step RACH procedure.

FIG. 2 is a flow chart of a contention-based 2-step RACH procedure. As illustrated in FIG. 2, the 2-step RACH procedure includes the following.

Step 1, the terminal transmits MsgA to the access network equipment, and the access network equipment receives MsgA.

MsgA includes the random access preamble and physical uplink shared channel (PUSCH) data. The PUSCH data may include the identity information of the terminal, such as C-RNTI. That is, MsgA includes the content of Msg1 and Msg3.

Step 2, the access network equipment transmits MsgB to the terminal, and the terminal receives MsgB.

MsgB includes the random access response and the contention resolution information. That is, MsgB includes the content of Msg2 and Msg4. The random access response includes the identifier of the random access preamble, and the contention resolution information may include the contention resolution identity.

It is assumed that the 4-step RACH procedure and the 2-step RACH procedure may share an RO (RACH Occasion) opportunity, that is, share the time-frequency resource for transmitting the random access preamble. If the terminal adopting the 4-step RACH procedure and the terminal adopting the 2-step RACH procedure transmit Msg1 and MsgA carrying the same random preamble on the same RO resource in the same RACH timeslot, because Msg2 (a random access response message corresponding to Msg1) and MsgB (a random access response message corresponding to MsgA) need to be addressed on the PDCCH through the random access radio network temporary identity (RA-RNTI, Random Access-Radio), and the RA-RNTI is determined by the time-frequency resource carrying Msg1 or MsgA, and the same RO in the same RACH timeslot corresponds to a unique RA-RNTI, the terminal adopting the 4-step RACH procedure and the terminal adopting the 2-step RACH procedure may not recognize the random access response message transmitted to it, which affects the access of the terminal.

Figure 3:
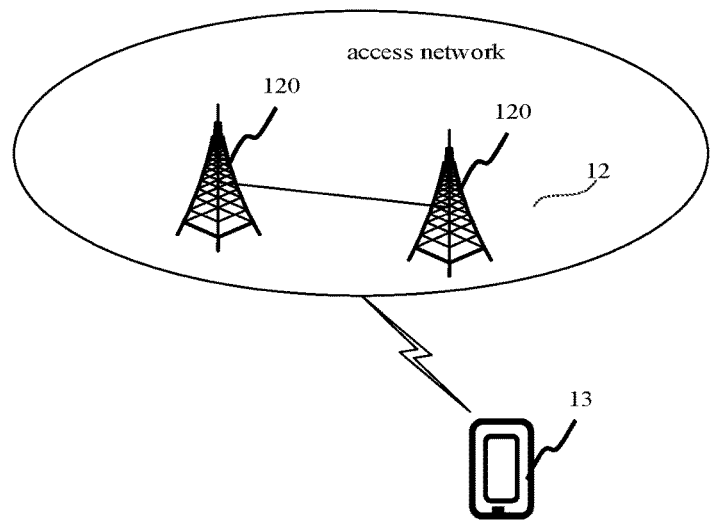
FIG. 3 is a schematic diagram of a network architecture according to embodiments of the disclosure.

FIG. 3 is a schematic diagram of a communication system according to embodiments of the disclosure. As illustrated in FIG. 3, the communication system may include an access network 12 and a terminal 13.

The access network 12 includes several access network equipments 120. The access network equipments 120 may be base stations. The base stations are apparatuses deployed in the access network and for providing wireless communication functions to the terminals. The base stations may include various forms of macro base stations, micro base stations, relay stations, access points, and the like. In systems adopting different wireless access technologies, devices equipped with functions of base stations may have different names. For example, in the long term evolution (LTE) system, it may be called eNodeB or eNB; and in the 5G New Radio (NR) system, it may be gNodeB or gNB. The name "base station" may be described and change as the communication technology advances. For the convenience of description, the above-mentioned apparatuses that provide wireless communication functions for terminals are collectively referred to as the access network equipments hereinafter.

The terminal 120 may include a hand-held device, an on-board device, a wearable device, and a computing device with the wireless communication function, and other processing device connected to a wireless modem, as well as various forms of UE (User Equipment), MS (Mobile Station), terminal devices, etc. For the convenience of description, in the embodiments of the disclosure, these devices are collectively called as the terminals. The access network equipment 120 and the terminal 13 communicate with each other through a certain air interface technology, such as a Uu interface.

The communication system and the service scenario described in the embodiments of the disclosure are intended to more clearly illustrate the technical solutions provided in the embodiments of the disclosure, and do not constitute a limitation to the technical solutions provided in the embodiments of the disclosure. Those of ordinary skill in the art will know that the technical solutions provided in the embodiments of the disclosure are equally applicable to similar technical problems as the communication system advances and new service scenarios emerges.

Figure 4:
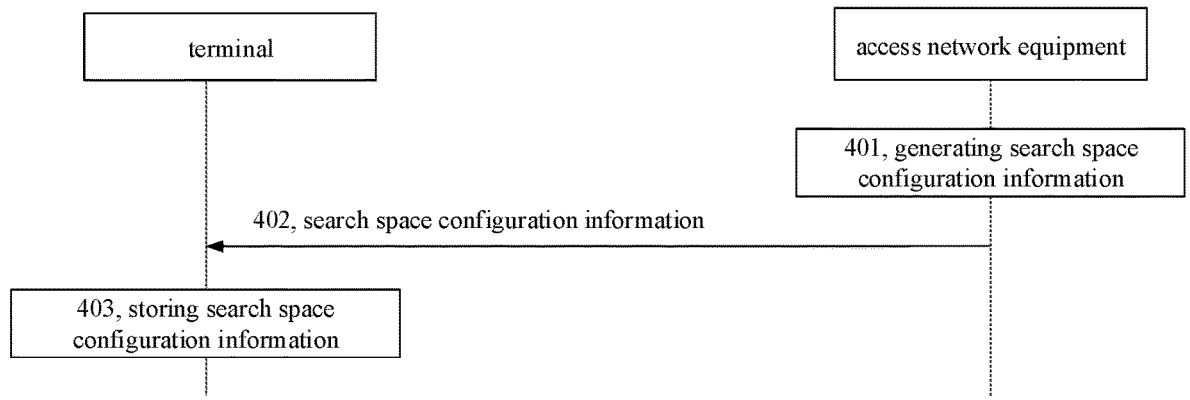
FIG. 4 is a flow chart illustrating a method for configuring a search space according to an embodiment.

FIG. 4 is a flow chart illustrating a method for configuring a search space according to an embodiment. Referring to FIG. 4, the method includes the following.

401, the access network equipment generates search space configuration information.

The search space configuration information includes a configuration of a first search space and a configuration of a second search space. The configuration of the first search space is configured to indicate the first search space carrying a first PDCCH. The first PDCCH is a PDCCH corresponding to message B (MsgB) in the 2-step RACH procedure. The configuration of the second search space is configured to indicate the second search space carrying a second PDCCH. The second PDCCH is a PDCCH corresponding to message 2 (Msg2) in the 4-step RACH procedure. The first search space and the second search space are different search spaces.

Optional, the first search space and the second search space may correspond to the same CORESET (COntrol REsource SET) or different CORESETs.

The CORESET is a time and frequency resource on which the terminal attempts to use one or more search spaces to decode the possible PDCCH. The starting position of the CORESET may be any position in the timeslot, or any position on the carrier in the frequency domain. The size and time-frequency position of the CORESET may be configured by the network side.

One search space is a group of candidate control channels having the same aggregation level and including control channel elements (CCEs), and one or more CCEs aggregate together to carry the PDCCH. One PDCCH may use 1, 2, 4, 8, 16 consecutive CCEs. The number of CCEs used by one PDCCH is called the aggregation level. The CCE is a component unit of the search space when the terminal performs blind inspection. One CCE includes 6 resource element groups (REGs). Each REG includes a resource block on an orthogonal frequency division multiplexing (OFDM) symbol. In the NR technology, the resource block is a measure in the frequency domain, and one resource block includes 12 consecutive subcarriers.

The terminal may have multiple search spaces. In the embodiment of the disclosure, the first search space is different from the second search space, which means that CCEs corresponding to the first search space are different from CCEs corresponding to the second search space. Exemplarily, different search spaces may be distinguished by different identifiers, that is, the configuration of the first search space and the configuration of the second search space both may be the identifiers of the search spaces, and the identifier of the first search space is different from the identifier of the second search space.

The first search space carrying the first PDCCH means that the terminal may detect the first PDCCH on the candidate control channels corresponding to the first search space, that is, the PDCCH corresponding to message B transmitted to the terminal itself. The second search space carrying the second PDCCH means that the terminal may detect the second PDCCH on the candidate control channels corresponding to the second search space, that is, the PDCCH corresponding to message 2 transmitted to the terminal itself.

402, the access network equipment transmits the search space configuration information, and the terminal receives the search space configuration information.

Optional, transmitting, by the access network equipment, the search space configuration information includes: transmitting, by the access network equipment, the search space configuration information through a system message or a radio resource control message.

Correspondingly, the terminal receives the search space configuration information through the system message or the radio resource control message.

Exemplarily, the system message may be a system information block SIB1.

403, the terminal stores the search space configuration information.

Therefore, the terminal may detect the PDCCH corresponding to message 2 or message B in the corresponding search space based on the search space configuration information in the subsequent random access procedure.

Optional, the method further includes: transmitting, by the access network equipment, configuration information of a random access response window, the configuration information of the random access response window being configured to indicate a duration of a first time window and a duration of a second time window, the first time window being a time window for detecting by the terminal the first PDCCH after transmitting MsgA in the 2-step RACH procedure and the first time window being a time window for detecting by the terminal the second PDCCH after transmitting message 1 in the 4-step RACH procedure, the second time window being a time window for detecting by the terminal the first PDCCH after transmitting MsgA in the 2-step RACH procedure, and the second time window being adjacent to the first time window and after the first time window.

That is, the first time window and the second time window are both configured to detect the PDCCH corresponding to MsgB, and the first time window is configured to detect the PDCCH corresponding to message 2. It may be seen that the duration of the time window configured to detect the PDCCH corresponding to MsgB is longer than the duration of the time window configured to detect the PDCCH corresponding to message 2. Since MsgA contains the random access preamble and the PUSCH data, if the access network equipment receives the random access preamble but does not receive the PUSCH data, it may wait a long duration before transmitting MsgB, so the PDCCH corresponding to MsgB needs to be detected in a longer duration.

Optional, the configuration information of the random access response window includes a duration of the random access response window and an offset value. The duration of the random access response window is configured to indicate the duration of the first time window, and the offset value is configured to indicate the duration of the second time window; or the duration of the random access response window is configured to indicate the duration of the second time window, and the offset value is configured to indicate the duration of the first time window.

Figure 5:
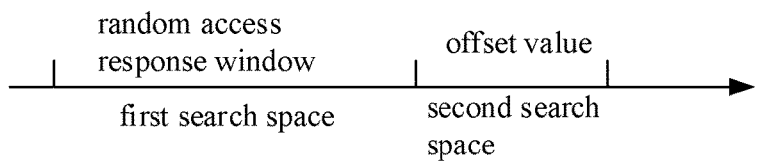
FIG. 5 and FIG. 6 are respectively schematic diagrams illustrating a correspondence relationship between time windows and search spaces according to an embodiment.
Figure 6:
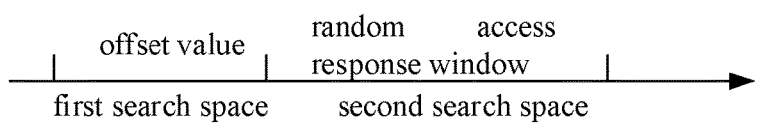

Exemplarily, FIG. 5 and FIG. 6 respectively illustrate a corresponding relationship between the first time window, the second time window and the first search space, the second search space. As illustrated in FIG. 5, the random access response window is the first time window, and the offset (offset value) is the second time window. In the first time window, the terminal that has transmitted MsgA may detect the PDCCH corresponding to MsgB in the first search space. In the second time window, the terminal that has transmitted MsgA may detect the PDCCH corresponding to MsgB in the first search space or detect the PDCCH corresponding to MsgB in the second search space. As illustrated in FIG. 6, the offset value is the first time window, and the random access response window is the second time window. The terminal that has transmitted MsgA may detect the PDCCH corresponding to MsgB in the first search space. In the second time window, the terminal that has transmitted MsgA may detect the PDCCH corresponding to MsgB in the first search space or detect the PDCCH corresponding to MsgB in the second search space.

Optional, the configuration information of the random access response window may be transmitted by the access network equipment to the terminal through a radio resource control message.

In a possible implementation, the second search space is only configured to carry the second PDCCH, that is, only carry the PDCCH corresponding to message 2 in the 4-step RCAH procedure.

In another possible implementation, the second search space may also be configured to carry the first PDCCH, that is, the second search space is multiplexed for the PDCCH corresponding to the message in the 2-step RCAH procedure and the PDCCH corresponding to message 2 in the 4-step RCAH procedure. For example, in the aforementioned second time window, the second search space is multiplexed for the PDCCH corresponding to the message in the 2-step RCAH procedure and the PDCCH corresponding to message 2 in the 4-step RCAH procedure.

It should be noted that the aforementioned 401-403 and the aforementioned optional actions may be combined arbitrarily.

Since the first PDCCH corresponding to message B and the second PDCCH corresponding to message 2 are carried in different search spaces, when receiving the random access response, if the terminal transmits MsgA first, it may use the first search space corresponding to the configuration of the first search space to detect the first PDCCH, and if the terminal transmits message 1 first, it may use the second search space corresponding to the configuration of the second search space to detect the second PDCCH. That is, the first PDCCH is separated from the second PDCCH through different search spaces. Therefore, when the terminal adopting the 2-step RACH procedure and the terminal adopting the 4-step RACH procedure transmit MsgA and Msg1 carrying the same random preamble on the same RO resource, the terminal may recognize the random access response message transmitted to itself accurately.

Figure 7:
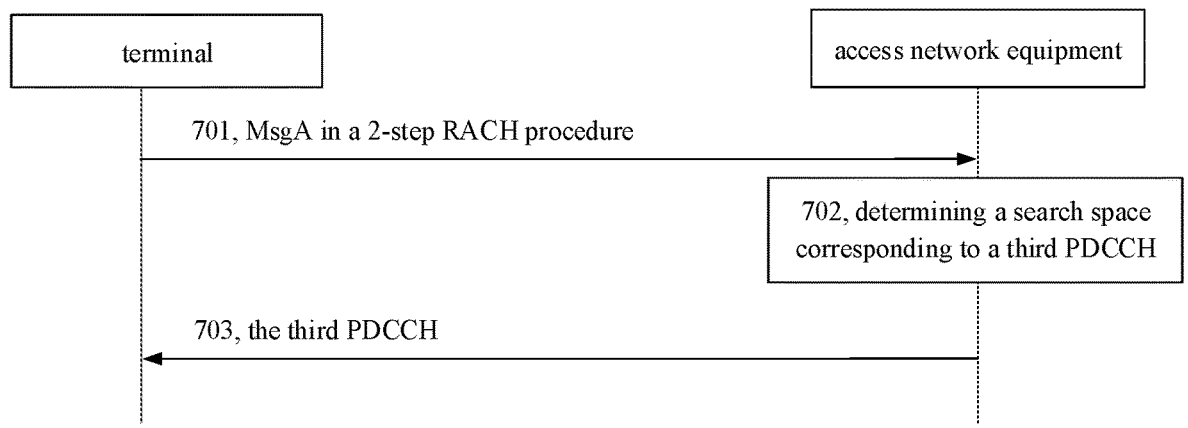
FIG. 7 is a flow chart illustrating a method for random accessing according to an embodiment.

FIG. 7 is a flow chart illustrating a method for random accessing according to an embodiment. Referring to FIG. 7, the method includes the following.

701, an access network equipment receives MsgA in a 2-step RACH procedure from a first terminal.

702, the access network equipment determines a search space corresponding to a third PDCCH from a first search space and a second search space, in which the third PDCCH is a PDCCH corresponding to a response message of MsgA.

703, the access network equipment transmits the third PDCCH on a resource corresponding to the determined search space.

The first search space is configured to carry a first PDCCH. The first PDCCH is a PDCCH corresponding to MsgB in the 2-step RACH procedure. The second search space is configured to carry a second PDCCH. The second PDCCH is a PDCCH corresponding to message 2 in a 4-step RACH procedure. The first search space and the second search space are different search spaces, that is, the first search space and the second search space indicated by the search space configuration information in the embodiments in FIG. 6.

Optional, the resource corresponding to the search space may be a time-frequency resource, such as the aforementioned candidate control channel.

Optional, the first search space and the second search space may correspond to the same CORESET or different CORESETs.

In a possible implementation, determining, by the access network equipment, the search space for carrying the third PDCCH from the first search space and the second search space, includes: determining, by the access network equipment, the first search space as the search space for carrying the third PDCCH.

In another possible implementation, determining, by the access network equipment, the search space for carrying the third PDCCH from the first search space and the second search space, includes: determining, by the access network equipment, the first search space as the search space for carrying the third PDCCH in response to the access network equipment transmitting the response message of the message A within a first time window, the first time window being the same as a time window for a second terminal to detect the second PDCCH after transmitting message 1 in the 4-step RACH procedure.

Optional, determining, by the access network equipment, the search space for carrying the third PDCCH from the first search space and the second search space further includes: determining, by the access network equipment, the search space corresponding to the first PDCCH to be the second search space in response to the access network equipment transmitting the response message of the message A within a second time window, the second time window being adjacent the first time window and after the first time window.

Optional, the method further includes: receiving, by the access network equipment, the message 1 in the 4-step RACH procedure, from the second terminal; and transmitting, by the access network equipment, the second PDCCH within the first time window through a resource corresponding to the second search space.

It should be noted that the aforementioned 701-703 and the aforementioned optional actions may be combined arbitrarily.

Figure 8:
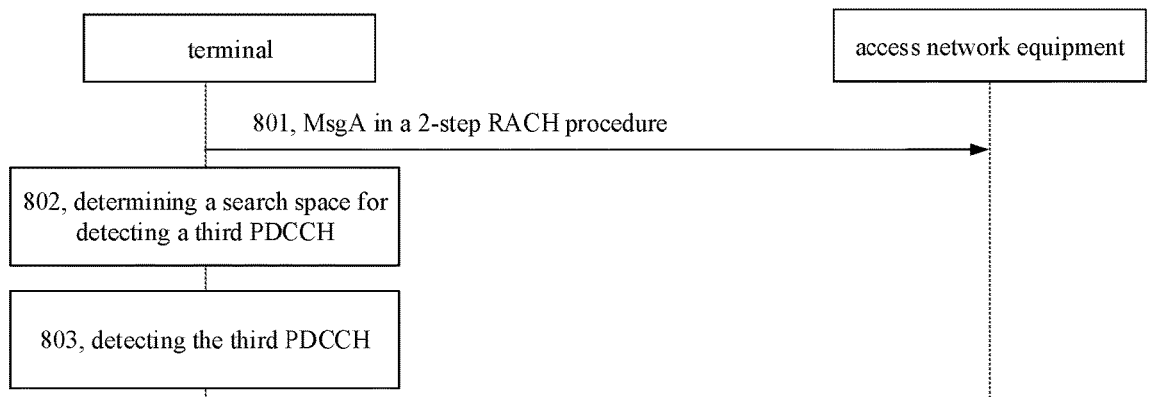
FIG. 8 is a flow chart illustrating a method for random accessing according to an embodiment.

FIG. 8 is a flow chart illustrating a method for random accessing according to an embodiment. It can be implemented based on the method for configuring the search space in FIG. 4. Referring to FIG. 8, the method includes the following.

801, a terminal transmits MsgA in a 2-step RACH procedure.

802, the terminal determines a search space for detecting a third PDCCH based on search space configuration information, in which the third PDCCH is a PDCCH corresponding to a response message of MsgA.

803, the terminal detects the third PDCCH based on the determined search space.

The search space configuration information includes a configuration of a first search space and a configuration of a second search space. The configuration of the first search space is configured to indicate the first search space carrying a first PDCCH, and the first PDCCH is a PDCCH corresponding to MsgB in the 2-step RACH procedure. The configuration of the second search space is configured to indicate the second search space carrying a second PDCCH, and the second PDCCH is a PDCCH corresponding to message 2 in the 4-step RACH procedure. The first search space and the second search space are different search spaces.

Optional, the first search space and the second search space correspond to the same control resource set or different control resource sets.

In a possible implementation, determining, by the terminal, the search space for detecting the third PDCCH based on the search space configuration information, includes: determining, by the terminal, the first search space as the search space for detecting the third PDCCH.

In another possible implementation, determining, by the terminal, the search space for detecting the first PDCCH based on the search space configuration information includes: determining, by the terminal, the first search space as the search space for detecting the third PDCCH within a first time window, the first time window being the same as a time window for a second terminal to detect the second PDCCH after transmitting message 1 in the 4-step RACH procedure.

Optional, determining, by the terminal, the search space for detecting the first PDCCH based on the search space configuration information further includes: determining, by the terminal, the second search space as the search space for detecting the third PDCCH within a second time window in response to the terminal not detecting the third PDCCH within the first time window, the second time window being adjacent to the first time window and after the first time window.

Optional, the method further includes: receiving, by the terminal, message B based on the detected third PDCCH.

It should be noted that the aforementioned 801-804 and the aforementioned optional actions may be combined arbitrarily.

Figure 9:
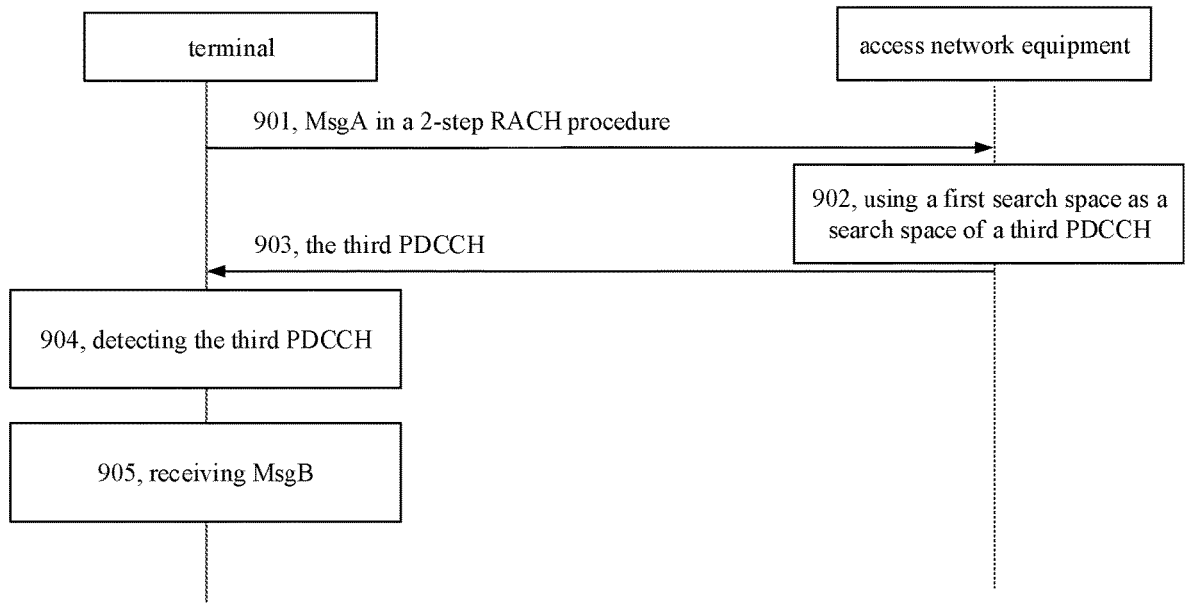
FIG. 9 is a flow chart illustrating a method for random accessing according to an embodiment.

FIG. 9 is a flow chart illustrating a method for random accessing according to an embodiment. It can be implemented based on the method for configuring the search space in FIG. 4. Referring to FIG. 9, the method includes the following.

901, a terminal transmits MsgA in a 2-step RACH procedure, and an access network equipment receives MsgA in the 2-step RACH procedure from a first terminal.

MsgA includes a random access preamble and PUSCH data.

Optional, the PUSCH data may include identity information of the terminal, such as C-RNTI or temporary C-RNTI. Optional, the PUSCH data may also include attribute information of the terminal, such as user type. The user type may include low-latency users and high-latency users.

Exemplarily, the terminal may use a pre-configured random access resource to transmit the first message.

Optional, the random access resource includes at least one of a time-frequency resource and a code resource (i.e., preamble resource).

Optional, the random access resource may be configured by the access network equipment through a system messages. For example, the protocol stipulates that the available random access resources are the first set, and the access network equipment may use a subset of the first set as the available random access resource and transmit it to the terminal through the system message.

902, the access network equipment uses a first search space as a search space of a third PDCCH, and the third PDCCH is a PDCCH corresponding to a response message of MsgA.

The response message of MsgA refers to MsgB corresponding to MsgA received by the access network equipment. Therefore, the third PDCCH belongs to the first PDCCH.

903, the access network equipment transmits the third PDCCH on a resource corresponding to the first search space.

After 903, the access network equipment may also transmit the response message of MsgA on a physical downlink shared channel (PDSCH) indicated by the first PDCCH.

904, the terminal detects the third PDCCH in the first search space.

In a possible implementation, if the access network equipment successfully parses the PUSCH data in MsgA transmitted by the UE, it means that the terminal may use the 2-step RACH procedure to complete random access, and the access network equipment may transmit MsgB including a random access response and contention resolution information to the UE. The random access response includes the identifier of the random access preamble, and the contention resolution information may include the contention resolution identity. In another possible implementation, if the access network equipment fails to parse the PUSCH data in MsgA, that is, the parsing fails, it means that the terminal may use the 4-step RACH procedure to complete random access instead, and the access network equipment may transmit MsgB similar to Msg2, that is, MsgB including a random access response.

There may be two cases when the access network equipment fails to parse MsgA. One is that the PRACH (i.e. the random access preamble) in MsgA is received but no PUSCH data is received, and the other is that the PRACH and PUSCH data in MsgA are received, but decoding the PUSCH data is unsuccessful. These two cases may be caused by the following factors, such as an inaccurate timing advance used by the terminal to transmit MsgA (that is, inaccurate transmitting time) and a low signal-to-noise ratio, which are not limited in the disclosure.

When the access network equipment receives the PRACH (that is, the random access preamble) in MsgA but does not receive the PUSCH data, the access network equipment may wait for the PUSCH data, which takes a long duration. When the access network equipment receives the PRACH and PUSCH data in MsgA, but the PUSCH data decoding is unsuccessful, decoding the PUSCH data may also take a long duration, resulting in a delay in transmitting MsgB. Therefore, it may be set a longer random response time window for the first PDCCH in order to satisfy transmission requirements of MsgB. In this case, in 904, the terminal may detect the third PDCCH in a first time window and a second time window. For the related description of the first time window and the second time window, reference should be made to the related content of FIG. 4, which is not repeated herein.

It should be noted that, for a terminal that performs random access through the 4-step RACH procedure, the second PDCCH may be detected only in the first time window.

904 may include the following. The terminal determines CCEs that may carry the third PDCCH based on the first search space and the corresponding CORESET; and performs addressing through the RA-RNTI on each CCE that may carry the third PDCCH; and if the addressing is successful, the third PDCCH is decoded to obtain the identifier of the preamble. If the identifier of the preamble transmitted by the terminal through MsgA exists in the identifier of the preamble obtained, it means that the third PDCCH is detected; if the identifier of the preamble transmitted by the terminal through MsgA does not exist in the identifier of the preamble obtained, it means that the third PDCCH is not detected. If the addressing is unsuccessful, it means that the third PDCCH is not detected.

Here, the RA-RNTI corresponds to the RO resource, and one RO resource has a unique RA-RNTI. The corresponding relationship between RO resources and RA-RNTIs may be configured by the access network equipment and notified to the terminal in the cell through the system message.

If the terminal detects the third PDCCH in the first search space, the method further includes 905.

905, MsgB is received based on the detected third PDCCH.

That is, the response message of MsgA is received.

905 may include: obtaining scheduling information of MsgB based on the detected third PDCCH, where the scheduling information is configured to indicate a time-frequency resource location of the PDSCH carrying the MsgB; and receiving the MsgB at the determined time-frequency resource location.

Exemplarily, the scheduling information of MsgB may be carried in downlink control information (DCI).

Since the first PDCCH corresponding to message B and the second PDCCH corresponding to message 2 are carried in different search spaces, when receiving the random access response, if the terminal transmits MsgA first, it may use the first search space corresponding to the configuration of the first search space to detect the first PDCCH, and if the terminal transmits message 1 first, it may use the second search space corresponding to the configuration of the second search space to detect the second PDCCH. That is, the first PDCCH is separated from the second PDCCH through different search spaces. Therefore, when the terminal adopting the 2-step RACH procedure and the terminal adopting the 4-step RACH procedure transmit MsgA and Msg1 carrying the same random preamble on the same RO resource, the terminal may recognize the random access response message transmitted to itself accurately.

Figure 10:
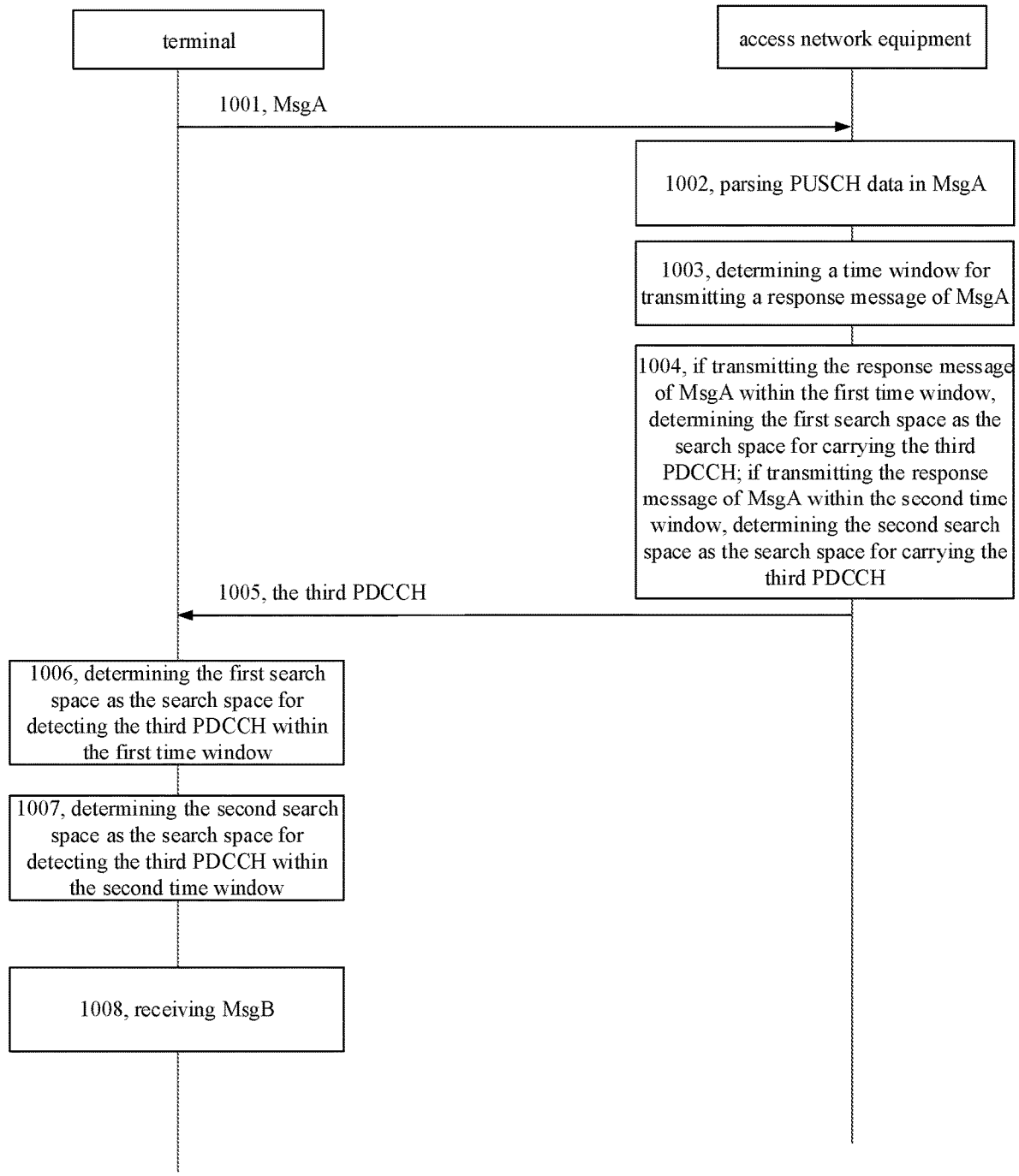
FIG. 10 is a flow chart illustrating a method for random accessing according to an embodiment.

FIG. 10 is a flow chart illustrating a method for random accessing according to an embodiment. It can be implemented based on the method for configuring the search space in FIG. 4. Referring to FIG. 10, the method includes the following.

1001, a terminal transmits MsgA to an access network equipment, and the access network equipment receives MsgA transmitted by the terminal.

For related descriptions of MsgA, reference should be made to the foregoing 901, and detailed descriptions are omitted herein.

1002, the access network equipment parses PUSCH data in MsgA.

Exemplarily, if the access network equipment successfully parses the PUSCH data in MsgA, it means that the terminal may use the 2-step RACH procedure to complete random access, and the access network equipment may transmit MsgB including a random access response and contention resolution information to the terminal. The random access response includes an identifier of the random access preamble, and the contention resolution information may include the contention resolution identity. If the access network equipment fails to parse the PUSCH data in MsgA, that is, the parsing fails, it means that the terminal may use the 4-step RACH procedure to complete random access instead, and the access network equipment may transmit MsgB similar to Msg2 to the terminal, that is, the MsgB that includes a random access response.

There may be two cases when the access network equipment fails to parse MsgA. One is that the PRACH (i.e. the random access preamble) in MsgA is received but no PUSCH data is received, and the other is that the PRACH and PUSCH data in MsgA are received, but decoding the PUSCH data is unsuccessful. These two cases may be caused by the following factors, such as an inaccurate timing advance used by the terminal to transmit MsgA (that is, inaccurate transmitting time) and a low signal-to-noise ratio, which are not limited in the disclosure.

1003, the access network equipment determines a time window for transmitting a response message of MsgA.

1003 may include: if the access network equipment successfully parses the PUSCH data in MsgA, determining that the time window for transmitting MsgB is a first time window; or, if the access network equipment fails to parse the PUSCH data in MsgA, determining that the time window for transmitting MsgB is a second time window. The first time window is the same as a time window for receiving message 2 after the second terminal transmits message 1 in the 4-step RACH procedure, and the second time window is adjacent the first time window is and after the first time window.

Correspondingly, due to the different transmission conditions of the two types of MsgB, MsgB received by the terminal within the second time window is probably to be transmitted by the access network equipment when the PUSCH data in MsgA is unsuccessfully parsed, and MsgB received by the terminal within the first time window is probably to be transmitted by the access network equipment after the PUSCH data in MsgA is successfully parsed.

1004, if the access network equipment determines to transmit the response message of MsgA within the first time window, the access network equipment determines the first search space as the search space for carrying the third PDCCH; if the access network equipment determines to transmit MsgB within the second time window, the second search space is determined as the search space for carrying the third PDCCH.

Since the terminal is more likely to receive MsgB in the second time window than to receive Msg2 in the second time window, there is no need to use the first search space to detect the third PDCCH in the second time window, but the second search space same to the 4-step RACH procedure is used to detect the third PDCCH. In the first time window, the terminal may receive message 2 in the 4-step RACH procedure and MsgB in the 2-step RACH procedure, so that different search spaces are needed to distinguish PDCCHs corresponding to message 2 and MsgB.

In step 1005, the access network equipment transmits the third PDCCH on the resource corresponding to the determined search space.

After 1005, the method further includes: transmitting the response message of MsgA on the PDSCH corresponding to the third PDCCH.

1006, the terminal determines the first search space as the search space for detecting the third PDCCH within the first time window; if the third PDCCH is detected within the first time window, 1008 is executed, and if the third PDCCH is not detected within the first time window, 1007 is executed.

1007, the terminal determines the second search space as the search space for detecting the third PDCCH within the second time window, and the second time window is adjacent to the first time window and after the first time window. If the third PDCCH is detected within the second time window, 1008 is executed, and if the first PDCCH is not detected within the second time window, the current procedure is exited.

1008, the terminal receives MsgB based on the detected third PDCCH.

1008 may include: obtaining scheduling information of MsgB based on the detected third PDCCH, where the scheduling information is configured to indicate a time-frequency resource location of the PDSCH carrying MsgB; and receiving MsgB at the determined time-frequency resource location.

In 1006 to 1008, if the third PDCCH is detected within the first time window, the received MsgB may include a random access response and contention resolution information. The random access response includes the identifier of the random access preamble, and the contention resolution information may include the contention resolution identity. Therefore, the 2-step RACH procedure is completed.

If the third PDCCH is detected within the second time window, the received MsgB is similar to Msg2 and may be used to instruct the terminal to fall back to the 4-step RACH procedure for random access, for example, to transmit message 3. At this time, MsgB may include parameters such as the identifier of the random access preamble corresponding to MsgA, the uplink transmission timing advance, the uplink resource allocated to the terminal, and the temporary C-RNTI.

Since the first PDCCH corresponding to message B and the second PDCCH corresponding to message 2 are carried in different search spaces, when receiving the random access response, if the terminal transmits MsgA first, it may use the first search space corresponding to the configuration of the first search space to detect the first PDCCH, and if the terminal transmits message 1 first, it may use the second search space corresponding to the configuration of the second search space to detect the second PDCCH. That is, the first PDCCH is separated from the second PDCCH through different search spaces. Therefore, when the terminal adopting the 2-step RACH procedure and the terminal adopting the 4-step RACH procedure transmit MsgA and Msg1 carrying the same random preamble on the same RO resource, the terminal may recognize the random access response message transmitted to itself accurately.

In addition, since there is no need to distinguish the first search space and the second search space in the second time window, the control information may be multiplexed in one search space, which is beneficial to improve resource utilization.

Figure 11:
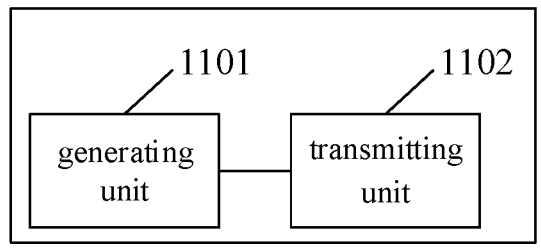
FIG. 11 is a block diagram illustrating an apparatus for configuring a search space according to an embodiment.

FIG. 11 is a block diagram illustrating an apparatus for configuring a search space according to an embodiment. The apparatus has the function of realizing the access network equipment in the above method embodiments, and the function may be realized by hardware or by hardware executing corresponding software. As illustrated in FIG. 11, the apparatus includes a generating unit 1101 and a transmitting unit 1102. The generating unit 1101 is configured to generate search space configuration information, the search space configuration information including a configuration of a first search space and a configuration of a second search space, the configuration of the first search space being configured to indicate the first search space for carrying a first physical downlink control channel (PDCCH), the first PDCCH being a PDCCH corresponding to message B in a 2-step random access channel (RACH) procedure, the configuration of the second search space being configured to indicate the second search space for carrying a second PDCCH, the second PDCCH being a PDCCH corresponding to message 2 in a 4-step RACH procedure, the first search space and the second search space are different search spaces. The transmitting unit 1102 is configured to transmit the search space configuration information.

Optional, the first search space and the second search space may correspond to the same CORESET or different CORESETs.

Optional, the transmitting unit 1102 is configured to transmit the search space configuration information through a system message or a radio resource control message.

Optional, the system message is SIB1.

Optional, the transmitting unit 1102 is further configured to transmit configuration information of a random access response window, the configuration information of the random access response window being configured to indicate a duration of a first time window and a duration of a second time window, the first time window being a time window for detecting by a terminal the first PDCCH after transmitting message A in the 2-step RACH procedure and the first time window being a time window for detecting by the terminal the second PDCCH after transmitting message 1 in the 4-step RACH procedure, the second time window being a time window for detecting by the terminal the first PDCCH after transmitting message A in the 2-step RACH procedure, and the second time window being adjacent to the first time window and after the first time window.

Optional, the configuration information of the random access response window includes a duration of the random access response window and an offset value, the duration of the random access response window is configured to indicate the duration of the first time window, and the offset value is configured to indicate the duration of the second time window; or the duration of the random access response window is configured to indicate the duration of the second time window, and the offset value is configured to indicate the duration of the first time window.

Figure 12:
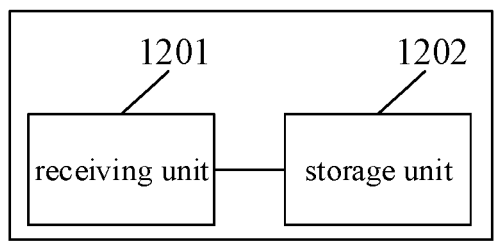
FIG. 12 is a block diagram illustrating an apparatus for configuring a search space according to an embodiment.

FIG. 12 is a block diagram illustrating an apparatus for configuring a search space according to an embodiment. The apparatus has the function of realizing the terminal in the above method embodiments, and the function may be realized by hardware or by hardware executing corresponding software. As illustrated in FIG. 12, the apparatus includes a receiving unit 1201 and a storage unit 1202. The receiving unit 1201 is configured to receive search space configuration information, the search space configuration information including a configuration of a first search space and a configuration of a second search space, the configuration of the first search space being configured to indicate the first search space for carrying a first physical downlink control channel (PDCCH), the first PDCCH being a PDCCH corresponding to message B in a 2-step random access channel (RACH) procedure, the configuration of the second search space being configured to indicate the second search space for carrying a second PDCCH, the second PDCCH being a PDCCH corresponding to message 2 in a 4-step RACH procedure, the first search space and the second search space are different search spaces. The storage unit 1202 is configured to store the search space configuration information.

Optional, the first search space and the second search space may correspond to the same CORESET or different CORESETs.

Optional, the receiving unit 1201 is configured to receive the search space configuration information, through a system message or a radio resource control message.

Optional, the system message is a system information block SIB1.

Optional, the receiving unit 1201 is further configured to receive configuration information of a random access response window, the configuration information of the random access response window being configured to indicate a duration of a first time window and a duration of a second time window, the first time window being a time window for detecting by the terminal the first PDCCH after transmitting message A in the 2-step RACH procedure and the first time window being a time window for detecting by the terminal the second PDCCH after transmitting message 1 in the 4-step RACH procedure, the second time window being a time window for detecting by the terminal the first PDCCH after transmitting message A in the 2-step RACH procedure, and the second time window being adjacent to the first time window and after the first time window.

Optional, the configuration information of the random access response window includes a duration of the random access response window and an offset value, the duration of the random access response window is configured to indicate the duration of the first time window, and the offset value is configured to indicate the duration of the second time window; or the duration of the random access response window is configured to indicate the duration of the second time window, and the offset value is configured to indicate the duration of the first time window.

Figure 13:
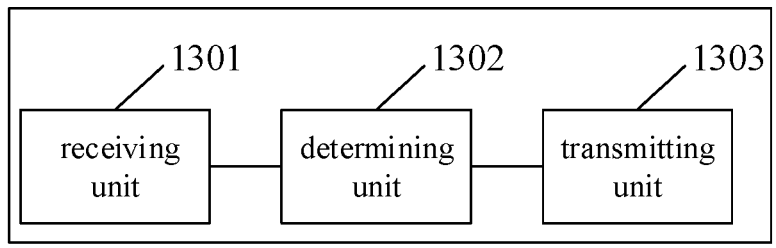
FIG. 13 is a block diagram illustrating an apparatus for random accessing according to an embodiment.

FIG. 13 is a block diagram illustrating an apparatus for configuring a search space according to an embodiment. The apparatus has the function of realizing the access network equipment in the above method embodiments, and the function may be realized by hardware or by hardware executing corresponding software. As illustrated in FIG. 13, the apparatus includes a receiving unit 1301, a determining unit 1302 and a transmitting unit 1303. The receiving unit 1301 is configured to receive message A in a 2-step random access channel (RACH) procedure, from a first terminal. The determining unit 1302 is configured to determine a search space for carrying a third physical downlink control channel (PDCCH) from a first search space and a second search space, the third PDCCH being a PDCCH corresponding to a response message of the message A. The transmitting unit 1303 is configured to transmit the third PDCCH on a resource corresponding to the determined search space. The first search space is configured to carry a first PDCCH, the first PDCCH is a PDCCH corresponding to message B in the 2-step RACH procedure, and the second search space is configured to carry a second PDCCH, the second PDCCH is a PDCCH corresponding to message 2 in a 4-step RACH procedure, and the first search space and the second search space are different search spaces.

Optional, the first search space and the second search space may correspond to the same CORESET or different CORESETs.

Optional, the determining unit 1302 is configured to determine the first search space as the search space for carrying the third PDCCH.

Optional, the determining unit 1302 is configured to determine the first search space as the search space for carrying the third PDCCH in response to the access network equipment determining to transmit the response message of the message A within a first time window, the first time window being the same as a time window for a second terminal to receive message 2 after transmitting message 1 in the 4-step RACH procedure.

Optional, the determining unit 1302 is further configured to determine the second search space as the search space for carrying the third PDCCH in response to the access network equipment determining to transmit the response message of the message A within a second time window, the second time window being adjacent the first time window and after the first time window.

Optional, the receiving unit 1301 is further configured to receive the message 1 in the 4-step RACH procedure, from the second terminal; and the transmitting unit 1303 is further configured to transmit the second PDCCH within the first time window through a resource corresponding to the second search space.

Figure 14:
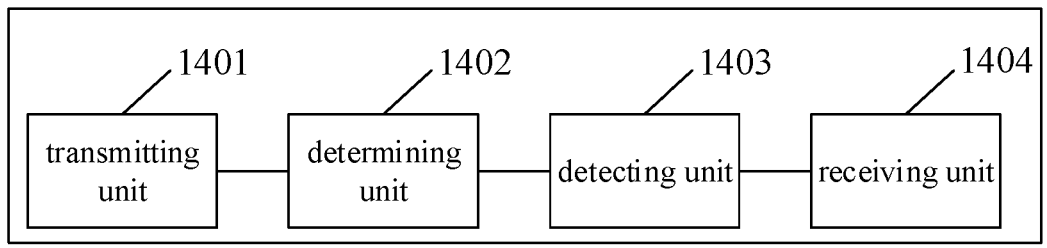
FIG. 14 is a block diagram illustrating an apparatus for random accessing according to an embodiment.

FIG. 14 is a block diagram illustrating an apparatus for configuring a search space according to an embodiment. The apparatus has the function of realizing the terminal in the above method embodiments, and the function may be realized by hardware or by hardware executing corresponding software. As illustrated in FIG. 14, the apparatus includes a transmitting unit 1401, a determining unit 1402 and a detecting unit 1403. The transmitting unit 1401 is configured to transmit message A in a 2-step random access channel (RACH) procedure. The determining unit 1402 is configured to determine a search space for detecting a third physical downlink control channel (PDCCH) based on search space configuration information, the third PDCCH being a PDCCH corresponding to a response message of the message A. The detecting unit 1403 is configured detect the third PDCCH based on the determined search space.

The search space configuration information includes a configuration of a first search space and a configuration of a second search space, the configuration of the first search space is configured to indicate the first search space for carrying a first PDCCH, the first PDCCH is a PDCCH corresponding to message B in the 2-step RACH procedure, the configuration of the second search space is configured to indicate the second search space for carrying a second PDCCH, the second PDCCH is a PDCCH corresponding to message 2 in a 4-step RACH procedure, the first search space and the second search space are different search spaces.

Optional, the first search space and the second search space may correspond to the same CORESET or different CORESETs.

Optional, the determining unit 1402 is configured to determine the first search space as the search space for detecting the third PDCCH.

Optional, the determining unit 1402 is configured to determine the first search space as the search space for detecting the third PDCCH within a first time window, the first time window being the same as a time window for a second terminal to receive message 2 after transmitting message 1 in the 4-step RACH procedure.

Optional, the determining unit 1402 is configured to determine the second search space as the search space for detecting the third PDCCH within a second time window in response to the terminal not detecting the third PDCCH within the first time window, the second time window being adjacent to the first time window and after the first time window.

Optional, the apparatus further includes: a receiving unit 1404 configured to receive message B based on the detected third PDCCH.

Figure 15:
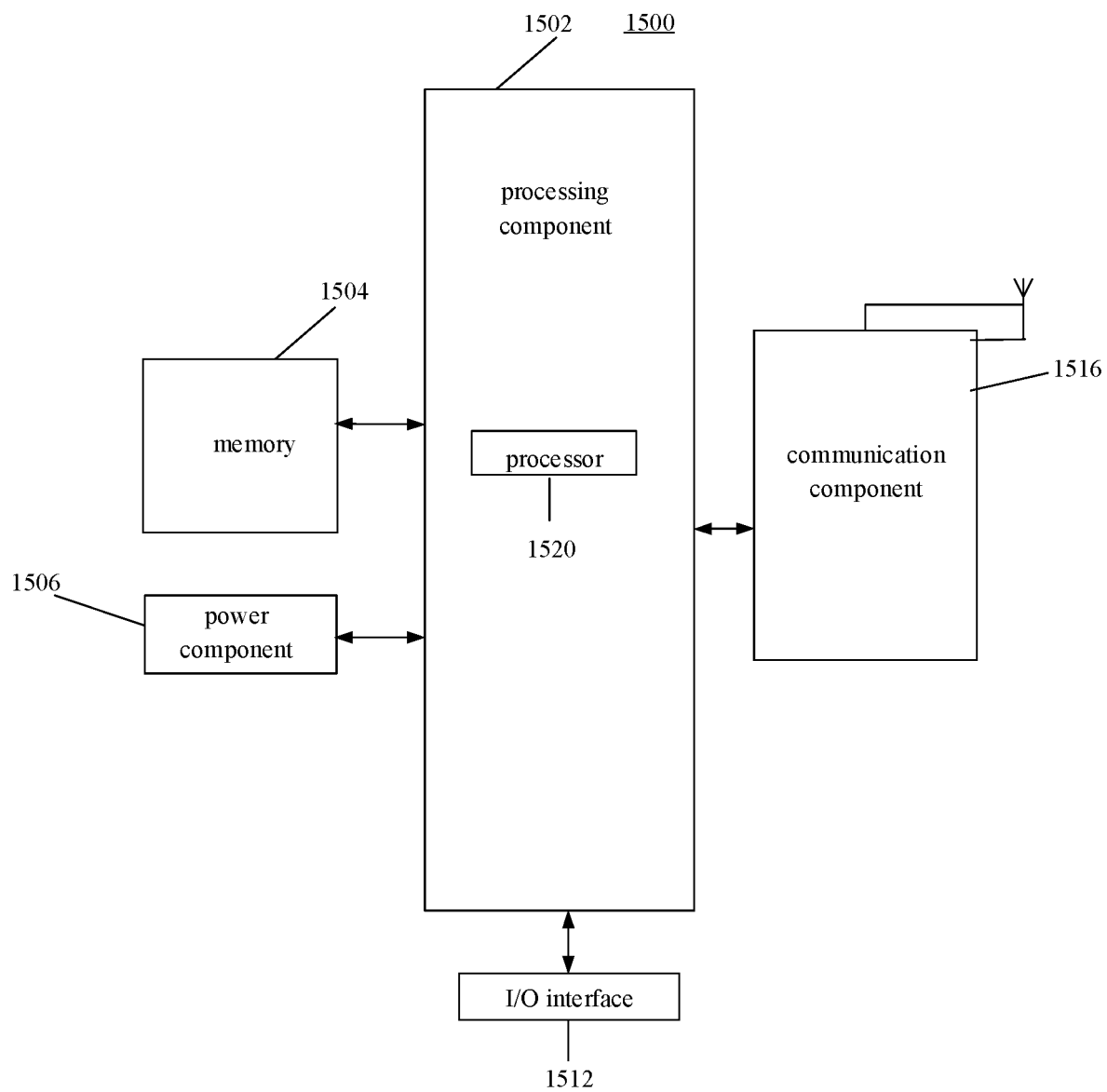
FIG. 15 is a block diagram illustrating a device for configuring a search space or a device for random accessing according to an embodiment.

FIG. 15 is a block diagram illustrating a device 1500 for configuring a search space or a device 1500 for random accessing according to an embodiment. The device 1500 is the above access network equipment. Referring to FIG. 15, the device 1500 may include one or more of the following components: a processing component 1502, a memory 1504, a power component 1506, an input/output (I/O) interface 1512, and a communication component 1516.

The processing component 1502 typically controls overall operations of the device 1500, such as the operations associated with display, telephone calls, data communications, camera operations, and recording operations. The processing component 1502 may include one or more processors 1520 to execute instructions to perform all or part of the steps in the above described methods. Moreover, the processing component 1502 may include one or more modules which facilitate the interaction between the processing component 1502 and other components. For instance, the processing component 1502 may include a multimedia module to facilitate the interaction between the multimedia component 15015 and the processing component 1502.

The memory 1504 is configured to store various types of data to support the operation of the device 1500. The memory 1504 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1506 provides power to various components of the device 1500. The power component 1506 may include a power management system, one or more power sources, and any other components associated with the generation, management, and distribution of power in the device 1500.

The I/O interface 1512 provides an interface between the processing component 1502 and peripheral interface modules, such as a keyboard, a click wheel, buttons, and the like. The buttons may include, but are not limited to, a home button, a volume button, a starting button, and a locking button.

The communication component 1516 is configured to facilitate communication, wired or wirelessly, between the device 1500 and other devices. The device 1500 can access a wireless network based on a communication standard, such as 2G, 3G, 4G or 5G or a combination thereof.

In exemplary embodiments, the 1500 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 1504, executable by the processor 1520 in the device 1500, for performing the above-described methods. For example, the non-transitory computer-readable storage medium may be a ROM, a RAM, a CD-ROM, a magnetic tape, a floppy disc, an optical data storage device, and the like.

Figure 16:
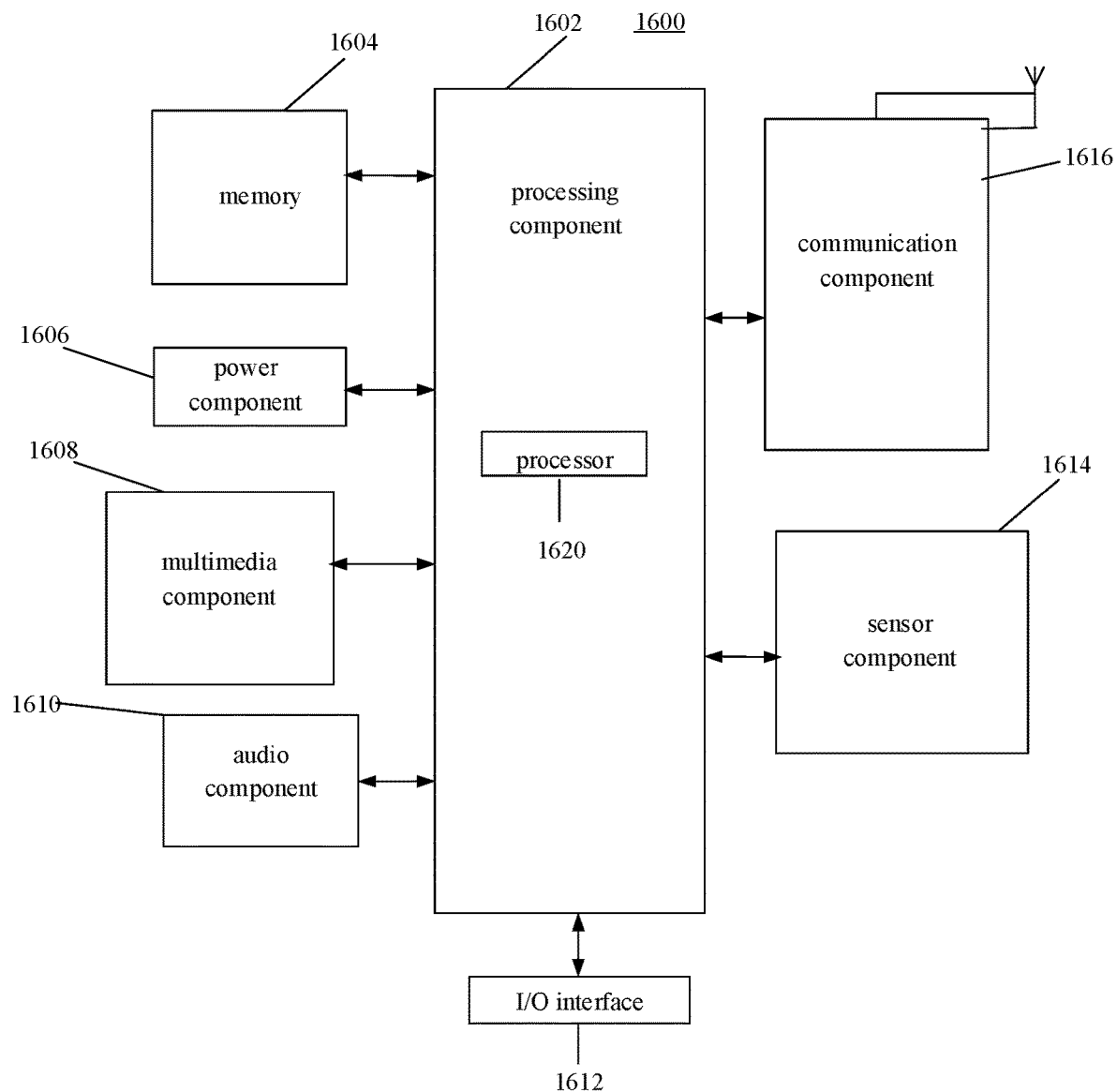
FIG. 16 is a block diagram illustrating a device for configuring a search space or a device for random accessing according to an embodiment.

FIG. 16 is a block diagram illustrating a device 1500 for configuring a search space or a device 1500 for random accessing according to an embodiment. The device 1600 is the above terminal. Referring to FIG. 16, the device 1600 may include one or more of the following components: a processing component 1602, a memory 1604, a power component 1606, a multimedia component 1608, an audio component 1610, an input/output (I/O) interface 1612, a sensor component 1614, and a communication component 1616.

The processing component 1602 typically controls overall operations of the device 1600, such as the operations associated with display, telephone calls, data communications, camera operations, and recording operations. The processing component 1602 may include one or more processors 1620 to execute instructions to perform all or part of the steps in the above described methods. Moreover, the processing component 1602 may include one or more modules which facilitate the interaction between the processing component 1602 and other components. For instance, the processing component 1602 may include a multimedia module to facilitate the interaction between the multimedia component 1608 and the processing component 1602.

The memory 1604 is configured to store various types of data to support the operation of the device 1600. Examples of such data include instructions for any applications or methods operated on the device 1600, contact data, phonebook data, messages, pictures, video, etc. The memory 1604 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1606 provides power to various components of the device 1600. The power component 1606 may include a power management system, one or more power sources, and any other components associated with the generation, management, and distribution of power in the device 1600.

The multimedia component 1608 includes a screen providing an output interface between the device 1600 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1608 includes a front camera and/or a rear camera. The front camera and the rear camera may receive an external multimedia datum while the device 1600 is in an operation mode, such as a photographing mode or a video mode. Each of the front camera and the rear camera may be a fixed optical lens system or have focus and optical zoom capability.

The audio component 1610 is configured to output and/or input audio signals. For example, the audio component 1610 includes a microphone ("MIC") configured to receive an external audio signal when the device 1600 is in an operation mode, such as a call mode, a recording mode, and a voice recognition mode. The received audio signal may be further stored in the memory 1604 or transmitted via the communication component 1616. In some embodiments, the audio component 1610 further includes a speaker to output audio signals.

The I/O interface 1612 provides an interface between the processing component 1602 and peripheral interface modules, such as a keyboard, a click wheel, buttons, and the like. The buttons may include, but are not limited to, a home button, a volume button, a starting button, and a locking button.

The sensor component 1614 includes one or more sensors to provide status assessments of various aspects of the device 1600. For instance, the sensor component 1614 may detect an open/closed status of the device 1600, relative positioning of components, e.g., the display and the keypad, of the device 1600, a change in position of the device 1600 or a component of the device 1600, a presence or absence of user contact with the device 1600, an orientation or an acceleration/deceleration of the device 1600, and a change in temperature of the device 1600. The sensor component 1614 may include a proximity sensor configured to detect the presence of nearby objects without any physical contact. The sensor component 1614 may also include a light sensor, such as a CMOS or CCD image sensor, for use in imaging applications. In some embodiments, the sensor component 1614 may also include an accelerometer sensor, a gyroscope sensor, a magnetic sensor, a pressure sensor, or a temperature sensor.

The communication component 1616 is configured to facilitate communication, wired or wirelessly, between the device 1600 and other devices. The device 1600 can access a wireless network based on a communication standard, such as 2G, 3G, 4G or 5G or a combination thereof. In one exemplary embodiment, the communication component 1616 receives a broadcast signal or broadcast associated information from an external broadcast management system via a broadcast channel. In one exemplary embodiment, the communication component 1616 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 1600 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 1604, executable by the processor 1620 in the device 1600, for performing the above-described methods. For example, the non-transitory computer-readable storage medium may be a ROM, a RAM, a CD-ROM, a magnetic tape, a floppy disc, an optical data storage device, and the like.

Exemplary embodiments of the disclosure also provide a communication system. The communication system includes an access network equipment and a terminal. The access network equipment includes a device for configuring a search space or a device for random accessing in FIG. 15, and the terminal includes a device for configuring a search space or a device for random accessing in FIG. 16.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for configuring a search space, comprising:
generating, by an access network equipment, a first configuration of a first search space and a second configuration of a second search space, wherein the first configuration being configured to indicate the first search space for carrying a first physical downlink control channel (PDCCH), the first PDCCH corresponds to message B in a 2-step random access channel (RACH) procedure, the second configuration is configured to indicate the second search space for carrying a second PDCCH, the second PDCCH corresponds to message 2 in a 4-step RACH procedure, the first search space and the second search space are different search spaces;
transmitting, by the access network equipment, the first configuration of the first search space and the second configuration of the second search spaces; and
transmitting, by the access network equipment, random-access-response-window configuration information of a random access response window, the random-access-response-window configuration information being configured to indicate a first duration of a first time window and a second duration of a second time window, the first time window being for detecting by a terminal the first PDCCH after transmitting message A in the 2-step RACH procedure and the first time window being for detecting by the terminal the second PDCCH after transmitting message 1 in the 4-step RACH procedure, the second time window being for detecting by the terminal the first PDCCH after transmitting message A in the 2-step RACH procedure, and the second time window being adjacent to the first time window and after the first time window.

2. The method as claimed in claim 1, wherein the first search space and the second search space correspond to the same control resource set or different control resource sets.

3. The method as claimed in claim 1, wherein transmitting, by the access network equipment, the first configuration of the first search space and the second configuration of the second search space, comprises:
transmitting, by the access network equipment, the first configuration of the first search space and the second configuration of the second search space through a system message or a radio resource control message.

4. The method as claimed in claim 3, wherein the system message is a system information block SIB1.

5. The method as claimed in claim 1, wherein the random-access-response-window configuration information comprises a random-access-response-window duration and an offset value, the random-access-response-window duration is configured to indicate the first duration, and the offset value is configured to indicate the second duration; or the random-access-response-window duration is configured to indicate the second duration, and the offset value is configured to indicate the first duration.

6. A method for configuring a search space, comprising:
receiving, by a terminal, a first configuration of a first search space and a second configuration of a second search space, wherein the first configuration is configured to indicate the first search space for carrying a first physical downlink control channel (PDCCH), the first PDCCH corresponding to message B in a 2-step random access channel (RACH) procedure, the second configuration is configured to indicate the second search space for carrying a second PDCCH, the second PDCCH corresponds to message 2 in a 4-step RACH procedure, the first search space and the second search space are different search spaces;
storing, by the terminal, the first configuration of the first search space and the second configuration of the second search space; and
receiving and storing, by the terminal, random-access-response-window configuration information of a random access response window, the random-access-response-window configuration information being configured to indicate a first duration of a first time window and a second duration of a second time window, the first time window being for detecting by the terminal the first PDCCH after transmitting message A in the 2-step RACH procedure and the first time window being for detecting by the terminal the second PDCCH after transmitting message 1 in the 4-step RACH procedure, the second time window being for detecting by the terminal the first PDCCH after transmitting message A in the 2-step RACH procedure, and the second time window being adjacent to the first time window and after the first time window.

7. The method as claimed in claim 6, wherein the first search space and the second search space correspond to the same control resource set or different control resource sets.

8. The method as claimed in claim 6, wherein receiving, by the terminal, the first configuration of the first search space and the second configuration of the second search space, comprises:
receiving, by the terminal, the first configuration of the first search space and the second configuration of the second search space, through a system message or a radio resource control message.

9. The method as claimed in claim 8, wherein the system message is a system information block SIB1.

10. The method as claimed in claim 6, wherein the random-access-response-window configuration information comprises a random-access-response-window duration of the random access response window and an offset value, the random-access-response-window duration being configured to indicate the first duration, and the offset value is configured to indicate the second duration; or the random-accessresponse-window duration is configured to indicate the second duration, and the offset value is configured to indicate the first duration.

11. A method for random accessing, comprising:
receiving, by an access network equipment, message A in a 2-step random access channel (RACH) procedure, from a first terminal;
determining, by the access network equipment, a search space for carrying a third physical downlink control channel (PDCCH) from a first search space and a second search space, wherein determining, by the access network equipment, the search space for carrying the third PDCCH from the first search space and the second search space, comprises: determining, by the access network equipment, the first search space as the search space for carrying the third PDCCH in response to the access network equipment determining to transmit the response message of the message A within a first time window, the first time window being the same as a time window for a second terminal to receive message 2 after transmitting message 1 in the 4-step RACH procedure; and
transmitting, by the access network equipment, the third PDCCH on a resource corresponding to the determined search space;
wherein, the first search space is configured to carry a first PDCCH, the first PDCCH corresponding to message B in the 2-step RACH procedure, and the second search space is configured to carry a second PDCCH, the second PDCCH corresponding to message 2 in a 4-step RACH procedure, and the first search space and the second search space are different search spaces, the third PDCCH corresponds to a response message of the message A.

12. The method as claimed in claim 11, wherein the first search space and the second search space correspond to the same control resource set or different control resource sets.

13. The method as claimed in claim 11, wherein determining, by the access network equipment, the search space for carrying the third PDCCH from the first search space and the second search space, comprises:
determining, by the access network equipment, the first search space as the search space for carrying the third PDCCH.

14. The method as claimed in claim 11, wherein determining, by the access network equipment, the search space for carrying the third PDCCH from the first search space and the second search space, further comprises:
determining, by the access network equipment, the second search space as the search space for carrying the third PDCCH in response to the access network equipment determining to transmit the response message of the message A within a second time window, the second time window being adjacent the first time window and after the first time window.

15. The method as claimed in claim 11, further comprising:
receiving, by the access network equipment, the message 1 in the 4-step RACH procedure, from the second terminal; and
transmitting, by the access network equipment, the second PDCCH within the first time window through a resource corresponding to the second search space.

16. A device for configuring a search space, comprising:
a processor;
a memory for storing executable instructions of the processor;
wherein, the processor is configured to load and execute the executable instructions to perform the method for configuring the search space according to claim 1.

17. A device for random accessing, comprising:
a processor;
a memory for storing executable instructions of the processor;
wherein, the processor is configured to load and execute the executable instructions to perform the method for random accessing according to claim 11.

* * * * *